July 9, 1940.   T. SCHREMS   2,207,639
INSTRUCTIONAL APPARATUS FOR TEACHING MUSIC
Filed Aug. 1, 1939
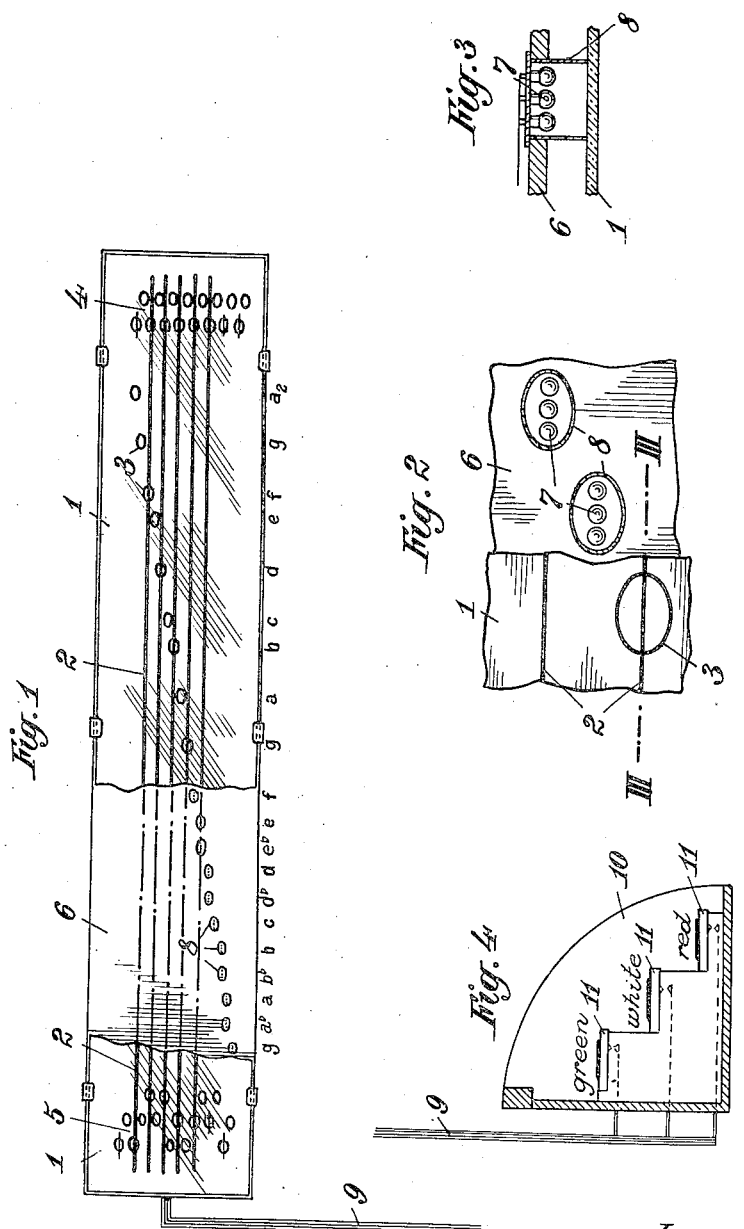
Inventor:
Theobald Schrems,
Attorneys Patented July 9, 1940

2,207,639

UNITED STATES PATENT OFFICE 2,207,639

INSTRUCTIONAL APPARATUS FOR TEACHING MUSIC

Theobald Schrems, Regensburg, Germany

Application August 1, 1939, Serial No. 287,791
In Germany March 29, 1938

5 Claims. (Cl. 84—471)

Instructional apparatus for teaching music have already been proposed, in which a transparent sheet is employed bearing the various notes, and the notes which are to be sung are caused to be illuminated with the aid of electric lamps, which are arranged behind the sheet. The illumination of the single notes is effected by means of a control table furnished with keys, upon the depression of which by the teacher the single lamps are connected in an electric circuit.

It is the object of the invention to improve generally on apparatus of this description, so that the semi-tones will also be immediately recognisable to the pupil as distinct from the whole tones, and that notes in other keys can also be made to appear which do not belong to the key recorded on the sheet. In accordance with the invention this object is accomplished by the fact that on the sheet there is recorded a gradually ascending diatonic scale, in which the semi-tones are indicated to the eye by one-half of the spacing of the whole tones, and the lamps assigned to the scale are arranged behind the sheet in chromatic order in equal spacing.

An embodiment of the invention is illustrated by way of example in the accompanying drawing.

Fig. 1 shows on the right and the left hand side the front of the sheet bearing the notes and in the middle the rear wall of the apparatus.

Fig. 2 shows a portion of Fig. 1 on enlarged scale.

Fig. 3 is a section taken on the line III—III in Fig. 2.

Fig. 4 illustrates diagrammatically the control table for the connecting up of the single lamps.

The apparatus comprises an extended box or casing, the front wall 1 of which forms the transparent sheet bearing the notes, and the rear wall 6 of which accommodates the lamps 7. On the sheet 1 there is recorded in thick, well visible lines the diatonic staff 2 having the diatonic notes from $g$ to $a_2$, i. e., notes within the range of the human voice. The same scale is recorded in vertical rows 4 down the right hand side of the sheet, in such a manner that the row on the left comprises the notes on the lines and the row on the right the notes between the lines. Further, on the left hand side of the sheet, also in vertical rows, there are recorded the principal triads 5 of the first, fourth and fifth intervals (cadences). The notes themselves are represented in the manner of semi-breves by ovals 3 having thick outlines.

The transparent sheet bearing the notes is made to be exchangeable. In the drawing it is shown in C major. As will be apparent, each semi-tone $b$—$c$, $e$—$f$ is made apparent to the eye by a small spacing, whilst the whole tones are spaced apart to an extent equal to twice the spacing of the semi-tones.

The lamps 7 on the rear wall of the casing are arranged within exactly the same area as the notes on the front wall 1, i. e., in gradually ascending order corresponding to the chromatic scale from $g$ to $a_2$ and at equal distances apart, so that each note of the chromatic scale on the transparent wall 1 can be illuminated as desired. Since, however, on the sheet 1 only the notes of a certain key are represented by an oval outline, the tones not belonging to this key will be made visible only in the form of mere spots of light. This arrangement of the lamps in chromatic order obviously results in the fact that also in the case of a different transparent sheet in another key the appertaining outlined notes representing the semi-tones are clearly distinguishable by one-half of the spacing of the whole tones.

To each note there are assigned three lamps 7 of different colour, for example providing green, red and white light respectively. In this way is is possible to illuminate each note in one of these colours or in two or three colours simultaneously. The teacher, therefore, is able to arrange exercises for two voices or parts. Each pupil sings according to his or her colour, soprano, for example, being guided by the white, mezzo-soprano by the red and alto by the green lights, so that also when the voices cross or two voices are required to sing the same note confusion cannot occur.

To improve the distinctness and to assist proper recognition of the notes each group of lamps 7, as shown in Fig. 3, is screened off against adjacent groups by a shaft or housing 8, which extends up to the front wall 1.

The lamps 7 are connected by electric leads 9 to a control table 10, which is furnished with three manuals 11 for switching on the lamps of different colour.

As already stated, there is provided by the arrangement of the lamps in the chromatic order of the tones the possibility of rendering visible in the form of spots of light tones in adjacent keys which do not belong to the key recorded on the sheet 1. In consequence, modulations of the C-major scale in adjacent keys, for example F major, B major, G major and D major and also the corresponding minor keys D minor, G minor, H minor and E minor are quite readily possible. If on the other hand a change is made to more remote keys, such as E flat major, A flat major, A major and E major and the parallel minor keys C minor, F minor, F sharp minor and C sharp minor, the translucent sheet bearing the notes is replaced by a new sheet. In this connection a sheet in A major is sufficient for the four sharp keys and a sheet in E flat major for the four flat keys.

The apparatus as described enables the teacher gradually to impart confidence to the pupil on the basis of scale, triad and cadence exercises in reading the notes and then to switch over to the confident singing of parts requiring two or more voices. The pupil learns the principal and subsidiary triads and seventh-accords by heart and in this way readily acquires the fundamentals of the theory of harmony and music.

From the pedagogical point of view a much more important feature in association with the apparatus according to the invention resides in the fact that the teacher is enabled continuously to observe the pupil even when using the apparatus. On the pupil's part interest and pleasure are awakened by the ever changing coloured notes, so that monotony and tendency for the attention to wander are eliminated.

The teacher is able to arrange new exercises without trouble or loss of time and in the case of exercises or movements calling for two and three voices to allow the pupils to sing individually or in groups, so that more and more confidence is acquired by the pupils. After sufficient practice a condition can be reached when difficult movements calling for three voices and played by the teacher on the control table can be sung without mistake or hesitation.

If desired, each manual of the control table can be furnished with an organ register, preferably with a gentle flute-like tone, which can be actuated by bellows controlled by the feet as in the case of a harmonium. The teacher is then enabled to correct pupils when notes appearing on the transluscent sheet are sung incorrectly. The register can also be used for the accompaniment of songs and can thus replace a separate school instrument.

What I claim as new and desire to secure by Letters Patent is:

1. In a device of the character described, a plurality of illuminatable lights arranged in the order of a rising chromatic scale with equal spacing between said lights, a transparent sheet covering said lights, a diatonic scale delineated upon said sheet with the notes of said diatonic scale being positioned over the corresponding lights of said chromatic scale, and means for illuminating said lights whereby said notes of said diatonic scale will be illuminated while other notes will appear merely as lights visible upon said sheet.

2. In a device as in claim 1, each of said lights comprising a plurality of differently colored electric bulbs, and said illuminating means comprising means for both separately and simultaneously illuminating the individual bulbs.

3. In a device of the character described, a wall, a plurality of lights mounted upon said wall in a rising chromatic scale with equal spacings between said lights, a transparent plate covering said lights, a staff and notes of a diatonic scale in a predetermined key delineated upon said plate with said notes positioned over the corresponding lights of said chromatic scale, and means for illuminating said lights.

4. In a device as in claim 3, a shield surrounding each of said lights and extending from said wall to said plate.

5. In a device as in claim 3, each of said lights comprising a group of differently colored electric bulbs, a shield surrounding each group of bulbs, and said means for illuminating said lights comprising means for both separately and simultaneously illuminating the individual bulbs in each group.

THEOBALD SCHREMS.